United States Patent [19]
Pelt et al.

[11] 3,972,233
[45] Aug. 3, 1976

[54] TURBINE METER BEARING

[75] Inventors: Thomas E. Pelt; Edward A. Seruga, both of Milwaukee, Wis.

[73] Assignee: Badger Meter, Inc., Milwaukee, Wis.

[22] Filed: Sept. 9, 1974

[21] Appl. No.: 504,245

[52] U.S. Cl. ............................ 73/231 R; 308/238; 308/DIG. 8
[51] Int. Cl.² ........................................ G01F 1/10
[58] Field of Search ................. 73/229, 230, 231; 308/238, DIG. 8

[56] References Cited
UNITED STATES PATENTS

| 2,648,573 | 8/1953 | Wheildon, Jr. ............ 308/DIG. 8 |
| 3,164,020 | 1/1965 | Groner et al. ................... 73/231 |
| 3,364,743 | 1/1968 | Clinton .......................... 73/231 |
| 3,371,531 | 3/1968 | Ezekiel et al. .................. 73/231 |
| 3,428,374 | 2/1969 | Orkin et al. .................... 308/238 |
| 3,546,940 | 12/1970 | Short .............................. 73/231 |

OTHER PUBLICATIONS

Coors Ceramics Bulletin No. 952 1/72 pp. 1–17.
Coors Ceramics Bulletin No. 953.

*Primary Examiner*—Herbert Goldstein
*Attorney, Agent, or Firm*—Neuman, Williams, Anderson & Olson

[57] ABSTRACT

A turbine meter having a center support bearing structure including components with mating coaxial cylindrical bearing surfaces formed of fired ceramic materials, in which one of the bearing surfaces is formed of a high strength ceramic consisting of at least 99.9% alumina having a crystal size of less than about 6 microns, and has a surface finish of about 7 microinches or less.

12 Claims, 5 Drawing Figures

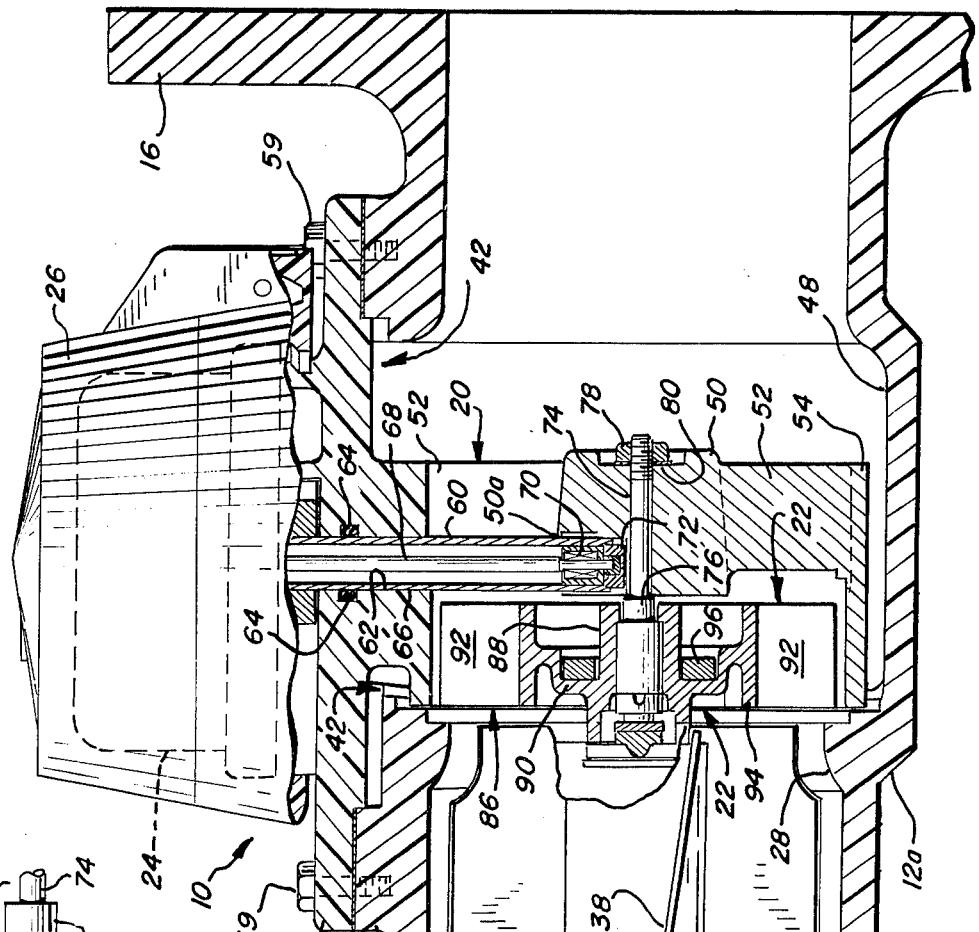

TURBINE METER BEARING

This invention relates to turbine meters and more particularly to improved bearings in such meters.

In a turbine meter for measuring fluid flow, as in most flow metering devices, accuracy of response of the sensing turbine to the flowing fluid is highly desirable. It also is desirable to obtain accurate responses over a wide range of flow rates. This requires sensitive response to low flow velocities where concomitantly low driving forces are available from the moving fluid and the impeller rotates at low angular velocities, as well as reliable response under high flow velocity conditions causing high rotational speeds of the impeller, even if maintained for substantial periods of time. Moreover, the flow may be such that either intermittent or continuous operation is called for. One of the problems encountered in meeting these parameters is the provision of a support bearing which consistently will assure the desired accurate responses of the impeller over long periods of use.

The support bearing for the impeller of a turbine meter normally is coaxial with the impeller and typically is in the form of a single spindle element which extends into a mating bearing element in the impeller. The spindle may be cantilever mounted, with a thrust bearing at the outer end for transmitting to the impeller support the thrust loading imposed on the impeller by the moving fluid. This bearing structure usually is exposed to the flowing fluid, which may serve to lubricate the bearing but also may contain foreign particles that can adversely affect the operation of the bearing. All of these problems and requirements occur in turbine meters intended for use in measuring the flow of water.

Various bearing designs have been proposed for turbine meters, utilizing various bearing materials. For example, various metals, graphite, and various ceramics have been used in turbine-type water meters. Some of these materials provided good bearing action and permitted accurate and consistent impeller response for varying periods of operation. However, typically the measuring response deteriorated significantly over extended periods of use, particularly at low flow rates.

It is an object of this invention to provide improved turbine meters.

It is another object of this invention to provide improved bearings for the impellers in turbine meters.

It is another object of this invention to provide improved bearings in turbine meters which will provide accurate consistent flow measuring response of the impeller over wide ranges of flow velocities and for extended periods of metering usage.

It is a further object of this invention to provide improved bearings in turbine water meters wherein the bearing assemblies are exposed to the water, and which meet the aforestated objects in an economical and practical manner.

For a more complete understanding of this invention, reference should now be had to the embodiment illustrated in greater detail in the accompanying drawings and described below by way of an example of the invention.

In the drawings,

FIG. 1 is a vertical center section view of a turbine meter employing teachings of this invention;

FIG. 2 is an enlarged exploded partial center section view of the impeller and support bearing arrangement of the meter of FIG. 1.

Figure 5:
FIGS. 3, 4 and 5 are photomicrographs at a magnification of 1000× of surface portions of certain bearing elements.

Referring now to the drawing, FIG. 1 illustrates a turbine-type meter 10 incorporating bearing improvements of this invention. The meter 10 is designed for metering a flow of water, such as from a municipal water system to an industrial user. The particular illustrated meter is designed as a so-called 3 inches meter, i.e., for metering liquid flow through a 3 inches conduit. The meter unit 10 includes a casing or conduit section 12 having end flanges 14 and 16 for joining with adjacent conduit sections in a conduit line. Mounted in and on the casing 12 are a flow guiding vane assembly 18, a rotor cage or head structure 20 which supports an impeller assembly 22, and a register unit 24, the latter being enclosed within a cover 26 atop the casing 12. The casing defines a cylindrical internal flow passage, with an annular boss or shoulder 28 forming a slightly constricted passage at the upstream face of the impeller assembly 22.

The flow guiding vane assembly 18 includes a slotted core or nose cone 30, which receives three interdigitally-related diametral plates 32, 34 and 36. Each of these three plates is of a width closely corresponding to the diameter of the casing 12, whereby the plates support the assembly 18 by abutment with the casing walls and in effect form six equiangularly-spaced radial vanes extending parallel to the axis of the casing on the upstream side of the impeller 22. The core element 30 is supported by the plates. The assembly 18 is inserted through the open end of the casing 12 at flange 14, with the inner end directly adjacent the upstream face of the impeller assembly 22. Shoulders 32a, 34a and 36a on the respective plates engage a shoulder 14a of the casing, and a retainer ring 37 snaps into an annular groove 14b outwardly of these shoulders to retain the assembly 18 in position in the casing 12. The plates are notched at the outer corners of their inner ends to conform generally to boss 28. The element 30 is aligned with and is of a diameter generally equal to the hub components of the impeller and the head structure and is provided with an upstream end having a smooth streamlined transition section.

The horizontal plate 34 is notched along one edge to provide a radially-extending support finger 34a and to accommodate a movable vane section 38. The vane section 38 is a long flat narrow plate which conforms generally to the notch in plate 34 and has a cylindrical sleeve 40 attached to its upstream end. The sleeve 40 encompasses the finger 34. The plate 38 is of a width to permit slight angular movement about the finger 34a within the confines of the casing 12, e.g., from a horizontal position coplanar with plate 34 to a lowermost position as illustrated in FIG. 1. Limited pivotal movement of the vane section 38 thus is provided about a horizontal axis transverse to the center line of the meter 10. At low flow velocities, the weight of plate 38 will tend to cause this plate to pivot toward lower positions as shown in FIG. 1, thereby increasing the angle of attack of a portion of the fluid on the impeller vanes and enhancing the impeller rotation response. At higher flow velocities the dynamic impingement of the flowing fluid will tend to raise the plate 38 to its position in coplanar relationship with the plate 34, thereby essentially removing any flow restricting effect at such flow rates.

The casing 12 is formed with a top opening 42 through which the head and impeller assembly 20-22 is inserted. An annular mounting shoulder or flange 46 circumscribes the opening 42. The casing 12 also is formed with an enlarged section defining an internal bay at 48 in traverse alignment with opening 42 to accommodate the metering unit within the casing. The bay 48 is U-shaped in cross-section, with the open end of the U coinciding with opening 42, and is of an internal diameter or width somewhat greater than the internal diameter of the flow passage in the remainder of casing 12.

The head structure 20 includes a center hub 50 to which are joined three narrow equiangularly spaced struts 52 extending from the hub radially outward to an outer support ring 54. The ring is attached to a support plate 56. The plate 56 covers opening 42 and seats on an appropriate sealing gasket 58 atop the annular shoulder 46. Bolts 59 extend through the plate 56 and into the shoulder 46 for securing the components together.

An indicator unit 24, such as a known-type of meter register, is mounted within housing 26 on the plate 56. A hollow tube 60 extends downward through a center opening 62 in the plate and into a recess 50a in the hub 50. An O-ring 64 forms a seal between the tube 60 and the plate 56. A drive shaft 68 extends from the register mechanism 24 downward through the tube 60 and has a driven magnet 70 mounted on its lower end in an appropriate position to be driven by a drive magnet 96 mounted on the impeller 22, as will be referred to further below. A plug and bearing assembly 72 closes the lower end of the tubular housing 60 and provides both axial and radial bearing support for the drive shaft 68.

A spindle 74 is mounted in a center opening in the hub 50, being coaxial with the casing 12. The spindle is formed with a boss 76 having a shoulder which abuts the upstream face of the hub 50. A nut 78 is threadably engaged on the downstream end of the spindle and abuts a washer 80 for securing the spindle in the hub. The spindle 74 projects from the upstream face of the hub 50 and provides a projecting cantilever support portion 74a for impeller assembly 22. A spindle tip 84 (FIG. 2) fits over and is secured on the projecting end portion 74a of the spindle and serves as a male bearing element for the impeller assembly 22, as will be described.

The impeller assembly 22 includes an impeller or rotor 86 which comprises a mounting hub 88, a support web 90 and a multiplicity of impeller blades 92 which extend radially outward from a ring portion 94 joined to the web. The blades or vanes 92 are canted relative to the longitudinal axis of the casing 12 to derive rotational torque from the fluid flowing axially through the meter, in a generally known manner. An annular magnet 96 is mounted in a recess 98 in the web 90, being suitably secured as by an appropriate adhesive. The magnet 96 has alternate pole zones spaced about its circumference and is in magnetic driving relationship with the magnet 70 for thereby operating the register mechanism 24 in accordance with the rotation of the impeller 86 when the meter unit is in operation. The adjacent components, including the impeller 86 and support structure 20 are of appropriate non-magnetic materials to facilitate the magnetic drive-coupling of the magnets 70 and 96.

It will be appreciated that the metering components, including the impeller unit 22, the register 24 and the drive system from the impeller to the register, are mounted on the support structure 20. Thus, the entire metering unit subassembly may be pre-assembled and may be installed in a casing 12, removed, and replaced as a unit through the opening 42. Cover plate 56, tube 60, plug 72 and the seals at 58 and 64 seal the opening 42 when the unit is in place. The ring portion 54 of the support is received in the bay 48 to reduce the flow restriction effect of the metering unit, and the impeller 86 is coaxially aligned with the flow stream passage defined by shoulder 28.

The hub 88 is formed with a central opening 100 therethrough, and with a first counterbore 102 entering from the upstream side of the rotor and forming an annular shoulder 104 for seating a bearing sleeve 106. The sleeve 106 receives and has radial sleeve bearing engagement with the spindle tip 84. An end stone 108 is supported in a recess 110 in the outer end of a spacer and carrier sleeve 112. The carrier sleeve and end stone are received within a second counterbore 114 of the hub 88, with the inner end of the carrier 112 extending into bore 102 and abutting bearing element 106. The upstream end of the hub is tapped at 116 to receive a threaded rotor tip 118 which serves as a retainer for the just-described bearing sleeve and end stone assembly which are installed through the upstream end of the axial opening in the hub 88. A resilient cushion or shock pad 120 is interposed between the retainer 118 and the end stone 108. Openings are provided through the tip element 118 and through the spacer sleeve 112, as at 122 and 124 respectively, to facilitate flow into and through the bearing assembly of liquid being metered, for lubrication and flushing purposes.

In the meter 10, there are three bearing elements for the rotor assembly 22, namely the spindle tip 84, the cylindrical sleeve 106 and the end stone 108. The spindle tip and the sleeve present rather closely fitting right-circular cylindrical surfaces and form the sleeve bearing for supporting the rotor. The end stone 108 abuts the distal end of the spindle tip 84, which extends through the open center of carrier sleeve 112, for transmission to the spindle 74 of the axial thrust generated by impingement of the flowing fluid on the canted blades 92. Good operating response of a water meter such as the unit 10 can be obtained for short periods using bearings formed of a variety of materials, including various ceramics. Ceramics are preferred in many uses because of their inertness, hardness and good wear characteristics. However, with most prior ceramic bearings, the sensitivity or accuracy of the meter in terms of indicated flow versus actual flow declines after a relatively short span of operation. This decline of accuracy is most critical and most pronounced at low flow rates. If the bearing elements are thoroughly cleaned as with acid, the meter response is restored temporarily but again declines with continued use. Examination of high magnification photographs of the bearings from such meters indicates that the problem arises from collection of foreign material from the water in and on the porous surfaces of the bearings.

It has been found that by using bearing elements of fired ceramic materials having certain characteristics, greatly improved performance of a turbine meter such as meter 10 can be obtained. More particularly, in accordance with this invention one of the cylindrical bearing surface elements 84 and 106 is formed of a ceramic which is at least 99.9% alumina ($Al_2O_3$), with a crystalline structure comprising unified crystals of less than about 6 microns in size, and has a surface finish of 7 microinches or less. The actual surface finishes preferably are in the range of 1–4 microinches, with most surfaces averaging 2-3 microinches. The average crystal size of the material preferably is about 3 microns. This material also has a very high hardness value, e.g., a Rockwell hardness index of about 90 (R45N) as determined by ASTM test E18-67, and high compressive strength. The other of the cylindrical bearing surface elements is formed of compatible ceramic material, such as of a somewhat lesser percentage of alumina and preferably with a somewhat rougher surface. The diametral dimensional clearance of the spindle tip 84 within the sleeve 106 is greater than 0.001 inch and preferably within a range of about 0.0015 to 0.005 inch. The endstone also is of a compatible ceramic such as of a lower percentage alumina.

A particularly preferred embodiment of the invention which has been found to provide consistent accuracy of metering response in a water meter utilizes a spindle tip 84 or sleeve 106, preferably the spindle tip, of a very high purity polycrystalline alumina ceramic produced by Coors Porcelain Company of Golden, Col. and identified by that company as its AD-999 product. This product consists of on the order of 99.98% pure alumina, with virtually total absence of glass firing impurities, and has a virtually 100% crystalline structure with an average crystal size of about 3 microns. Further information on this AD-999ceramic product and on various other alumina ceramics is given in "Coors Ceramic Handbook" Bulleting 952, Revised January 1972, and in "New Coors AD-999 Ceramic" Bulletin No. 953, both published by Coors Porcelain Company and which are incorporated herein by reference. The bearing surface of this 99.9+% alumina element is prepared to a surface finish of 4 microinches or smoother, as by polishing.

In this particular preferred embodiment the other of the mating cylindrical bearing elements 84 and 106 was formed of a polycrystalline fired alumina ceramic consisting of 99.8% alumina, namely a product of Coors Porcelain Company identified by that company as its AD-998 product. Further information of this AD-998 ceramic product, as well as on other ceramic products is given in Coors' Bulletin 952 dated "Revised July 1969." A bearing surface finish of 20 microinches was provided on the latter element by honing. Dimensional tolerances were maintained to provide a clearance of about 0.0015 to 0.0030 inch between the two cylindrical surfaces. The endstone 108 formed of fired alumina ceramic consisting of 94% alumina, namely, a product of Coors Porcelain Company identified by that company as its AD-94 product, with a 15 microinch finish on its end surfaces.

As one example of an embodiment of the invention in a particular meter unit, a 3 inch turbine meter corresponding to meter 10 was provided with the preferred bearing elements as described above including a cylindrical spindle tip 84 of the 99.9+% alumina product which was nominally 0.250 inch (0.2508–0.2515inch) in diameter and 0.653 inch in overall length, with a spherical outer end. The outer surface had a specified finish of 4 microinches or less. The spindle tip had a coaxial socket as illustrated 0.153 inch in diameter and 0.38 inch deep which received the end portion 74a of a stainless steel spindle 74 and was secured on that end portion by an epoxy adhesive. The steel spindle end 74a thus supported and reinforced the tip 84, which is particularly advantageous because of the rather brittle nature of the tip material. The bearing sleeve 106 which was formed of the 99.8% alumina product was a hollow cylinder 0.50 inch long, with an internal surface diameter of 0.2530–0.2538 inch and a 20 microinch surface finish, and an outside diameter of 0.350 inch. The endstone of the 94% alumina product was a disc slightly greater than ¼ inch in diameter and 0.065 inch thick, with a 15 microinch surface finish on each end so that the disc could be installed with either end against the spindle tip.

The foregoing meter bearing assembly was tested over a flow rate range of 5 gpm to 350 gpm and found to maintain accuracy of the flow measurement to within a desired parameter of ±1.5% of actual flow. In a series of tests conducted at the low flow rate of 5 gpm, this unit consistently registered from 98.5 to 99.5% of the actual flow. By way of comparison, the same unit with a 99.8% alumina ceramic spindle tip (Coors AD-998) declined from an initial measuring response of 98.8 to 94% of actual flow over a total test operation period of 4 hours.

In the water turbine meter 10, the flowing water lubricates the bearing surfaces. The openings 122 and 124 facilitate wetting of the bearings at start-up and thus facilitate reaching of the intended operational accuracy. Such wetting can be obtained without the openings, although more slowly. Once wetting has occurred, the accuracy response without the openings appears to be reduced only slightly, e.g., 0.2% relative to the same design with the openings.

Figure 4:
Figure 3:
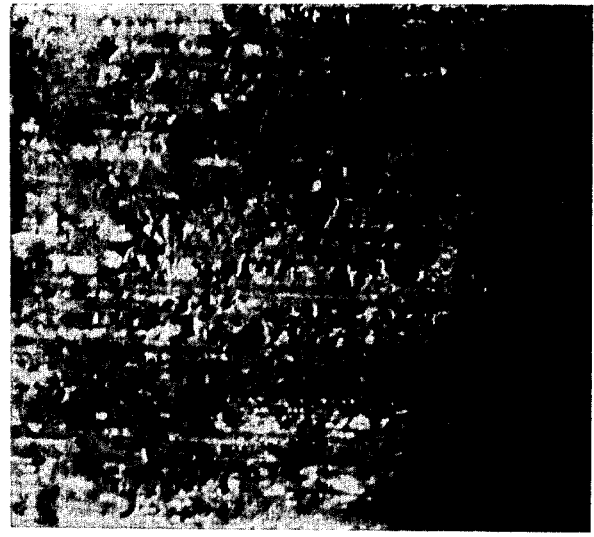

FIG. 3 is a reproduction of a photomicrograph of the bearing surface of a shaft of the AD-999 material with a 4 microinch finish, at an amplification of 1000 diameters. By way of comparison, FIGS. 4 and 5 are reproductions of photomicrographs of the bearing surfaces of shafts of the AD-998 product with a 20 microinch finish, also at amplification of 1000 diameters. These figures illustrate the smoothness and absence of porosity of the surface of the product of FIG. 3.

It is believed that the improved accuracy and consistency obtained with this invention is attributable to the very smooth, hard, non-porous or void-free bearing surface which is provided with the high purity alumina bearing surface element of the microstructure and surface finish described above. There also appears to be some self-polishing action between the respective engaging bearing surfaces which maintains or improves the response characteristics of the meter unit with use. The alumina ceramics described also provide mechanical properties, such as wear resistance and strength adequate to meet the load supporting, heat and wear conditions encountered in such meters and to withstand prolonged service at high flow rates.

In order to realize fully the advantages of the present invention, it is very important that at least one of the cylindrical bearing surface elements 84 or 106 be formed of a unified ceramic having an alumina content not appreciably lower than 99.9% and with a crystal size of less than about 6 microns. The most preferred ceramic is that material heretofore mentioned, namely the AD-999 alumina ceramic available from Coors Porcelain Company. Other less preferred ceramic materials which are available include American Lava Company's 99.9% alumina product sold under the designation $A_LS_lMag$ 805. Such ceramic material can be given a surface finish of 7 microinches or perhaps less.

When a ceramic material having an alumina content below 99.9% and/or with a larger crystal structure is used in a turbine water meter bearing as described, such as a ceramic having an alumina content of 99.8%, the apparent surface porosity increases. Debris accumulates in the bearing surface and the accuracy of the meter declines with the length of time in service, most critically at low flow rates. Desirable mechanical properties of the bearing, such as hardness and mechanical strength, also decline as the alumina content is lowered and when the crystal size increases.

Surface finishes referred to herein are as determined by measuring the arithmetic average of the surface deviation from a mean surface plane line, e.g., with stylus tracer-type instruments such as a Taylor-Taylor-Hobson Ltd. "Profilometer" or a "Surfindicator" of the Brush Instruments division of Clevite Corporation.

It will be apparent, particularly to those skilled in the art, that the improved bearing elements and assemblies disclosed herein may be embodied in a wide variety of turbine meter designs. Further, the bearing assembly may be of a simple design, and one which is economical to fabricate as well as being reliable, sturdy and accurate in use. This in turn facilitates obtaining accurate measurements over a wide measuring range, with a single stage meter.

Thus, it will be seen that improvements have been provided in turbine meters, and particularly in the bearing assemblies included in such meters, which meet the objects of this invention.

While a particular embodiment of this invention has been shown, it will be understood, of course, that the invention is not limited thereto since modifications may be made by those skilled in the art, particularly in light of the foregoing teachings. Therefore, it is contemplated by the appended claims to cover any such modifications as incorporate those features which may be said to constitute the essential features of these improvements within the true spirit and scope of the invention.

What is claimed is:

1. A turbine meter including a conduit housing, an impeller, means including a bearing assembly disposed in said conduit housing and rotatably supporting said impeller in said housing for rotary response of said impeller to flow of fluid in said housing, and means responsive to the rotation of said impeller for indicating the flow of such fluid through said housing, said bearing assembly including first and second members having mating coaxial cylindrical bearing surfaces, each of said members having at least a surface portion having a crystalline structure of a unified alumina ceramic material providing the respective cylindrical bearing surface, said surface portion of one of said members being at least 99.9% alumina and said bearing surface thereof having a surface finish of about 7 microinches or less, and said surface portion of the other of said members being formed of a lesser percentage of alumina and having a larger crystal size than said surface portion of said one of said members.

2. A turbine meter as in claim 1 wherein said ceramic material forming said surface portion of said one of said members comprises unified crystals less than about 6 microns in size.

3. A turbine meter as in claim 2 wherein said ceramic material has a hardness of 90 Rockwell or greater.

4. A turbine meter as in claim 1 wherein said first and second members have a diametral clearance therebetween within the range of 0.0015 to 0.005 inch.

5. A turbine meter as in claim 1 wherein said ceramic material forming said surface portion of said one of said members is about 99.98% alumina.

6. A turbine meter as in claim 5 wherein said ceramic material forming said surface portion of said one of said members comprises unified crystals less than about 6 microns in size and averaging about 3 microns in size.

7. A turbine meter as in claim 1 wherein said one of said members comprises a steel shaft and a ceramic bearing element encompassing said shaft and having an outer cylindrical surface forming said surface portion of said one of said members.

8. A turbine meter as in claim 7 wherein said ceramic bearing element is an elongated cylindrical element formed with a cylindrical socket therein which mates with an end portion of said shaft.

9. A turbine meter as in claim 8 wherein said ceramic bearing element is formed with a distal end portion at the end of said shaft and including a further unified ceramic bearing element mounted in said impeller for thrust-bearing engagement with said distal end portion of said ceramic bearing element on said shaft.

10. A turbine meter as in claim 1 wherein said bearing assembly includes a spindle shaft, said one of said bearing members being an elongated cylindrical element mounted on said shaft and including an outer end bearing surface, the other of said bearing members being an elongated member formed with an internal cylindrical bearing surface for mating with said cylindrical element and a further unified ceramic bearing element mounted in said impeller for thrust bearing engagement with said outer end bearing surface of said cylindrical element.

11. In a turbine meter having an impeller rotatably journaled on a bearing assembly in a conduit housing for rotary response of said impeller to the flow of fluid through said housing, the improvement wherein said bearing assembly includes first and second members having coaxial cylindrical bearing surfaces, each of said members having at least a surface portion having a crystalline structure of a unified ceramic material providing the respective cylindrical bearing surface, said surface portion of one of said members being at least 99.9% alumina and said bearing surface thereof having a surface finish of about 7 microinches or less, and said surface portion of the other of said members being formed of a lesser percentage of alumina and having a larger crystal size than said surface portion of said one of said members.

12. In a turbine meter as in claim 11, the further improvement wherein said ceramic material forming said surface portion of said one of said members comprises unified crystals less than about 6 microns in size.

* * * * *

UNITED STATES PATENT AND TRADEMARK OFFICE
CERTIFICATE OF CORRECTION

PATENT NO. : 3,972,233

DATED : August 3, 1976

INVENTOR(S) : Thomas E. Pelt and Edward A. Seruga

It is certified that error appears in the above-identified patent and that said Letters Patent are hereby corrected as shown below:

Column 5, line 44, delete "of" and insert --on--;

line 51, before "formed" insert --was--.

Column 8, line 47, Claim 11, before "coaxial" insert --mating--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*